(12) United States Patent
Sheng et al.

(10) Patent No.: US 11,498,276 B2
(45) Date of Patent: Nov. 15, 2022

(54) LOW COST OPTICAL ENGINE (71) Applicant: Texas Instruments Incorporated, Dallas, TX (US)

(72) Inventors: Zhongyan Sheng, Allen, TX (US); Alexander Lyubarsky, Dallas, TX (US); Stephen Aldridge Shaw, Plano, TX (US); Michael Terry Davis, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 398 days.

(21) Appl. No.: 16/520,249

(22) Filed: Jul. 23, 2019

(65) Prior Publication Data
US 2020/0031053 A1    Jan. 30, 2020

Related U.S. Application Data (60) Provisional application No. 62/702,739, filed on Jul. 24, 2018.

(51) Int. Cl.
*B29C 64/277* (2017.01)
*B33Y 30/00* (2015.01)
(Continued)

(52) U.S. Cl.
CPC ............ *B29C 64/277* (2017.08); *B33Y 30/00* (2014.12); *G02B 3/0006* (2013.01); *G02B 17/04* (2013.01); *G02B 27/0977* (2013.01)

(58) Field of Classification Search
CPC ... B29C 64/277; B29C 64/129; B29C 64/264; B33Y 30/00; B33Y 10/00; G02B 3/0006;
(Continued)

(56) References Cited

U.S. PATENT DOCUMENTS

2013/0201081 A1   8/2013  Evans et al.
2017/0072635 A1   3/2017  El-Siblani et al.
2017/0361530 A1*  12/2017 Liu ..................... B22F 10/366

FOREIGN PATENT DOCUMENTS

WO    2014130610    8/2014

OTHER PUBLICATIONS

International Search Report for PCT/US2019/043250 dated Nov. 17, 2019.

(Continued)

*Primary Examiner* — James C. Jones
(74) *Attorney, Agent, or Firm* — Michelle F. Murray; Charles A. Brill; Frank D. Cimino (57) ABSTRACT Described examples include an optical device, having a light source with a light source output and a light integrator having a light integrator input and a light integrator output, the light integrator input optically coupled to the light source output, and the light integrator configured to provide divergent light at the light integrator output responsive to the light at the light source output. The optical device also has projection optics with an optics input and an optics output, the projection optics configured to project output light at the optics output responsive to modulated light at the optics input, in which a focal point of the optics input matches a divergence of the modulated light and a spatial light modulator optically coupled between the light integrator output and the optics input, the spatial light modulator configured to provide the modulated light responsive to the divergent light.

20 Claims, 5 Drawing Sheets (51) Int. Cl.
*G02B 3/00* (2006.01)
*G02B 17/04* (2006.01)
*G02B 27/09* (2006.01)

(58) Field of Classification Search
CPC ...... G02B 17/04; G02B 27/0977; G02B 9/60; G02B 27/0994
See application file for complete search history.

(56) References Cited

OTHER PUBLICATIONS

Andre "LCD/LEDs based uTopiaPrinter widens the door to low-cost DIY SLA 3D Printing" 3D Printer News & 3D Printing News (Jul. 27, 2016) 3ders.org, Duizenblad 11, 2224DE Katwijk, The Netherlands, retrieved from url http://www.3ders.org/articles/20160727-LCD-led-based-utopiaprinter-widens-the-door-to-low-cost-diy-sla-3d-printing.html Jul. 23, 2019.

* cited by examiner

FIG. 6B

LOW COST OPTICAL ENGINE

CROSS-REFERENCE TO RELATED APPLICATIONS

This application claims the benefit under 35 U.S.C. § 119(e) to co-owned U.S. Provisional Patent Application Ser. No. 62/702,739, filed Jul. 24, 2018, entitled "DMD Optical Engine for 3D Printing," which is hereby incorporated by reference in its entirety herein.

TECHNICAL FIELD

This relates generally to optical engines, and more particularly to optical engines that may be applicable to three-dimensional printing.

BACKGROUND

Three-dimensional printing is useful in many fields, such as manufacturing and artistic design. The cost of three-dimensional printing is falling; thus, making more and more applications for this technology financially feasible. One type of three-dimensional printer is the photo-polymerization printer. This type of printer uses light to convert a liquid polymer to a solid. One type of photopolymerization printer is a vat type. This type of printer uses a vat with a transparent bottom to contain photo-polymerizable liquid. Initially, a lift plate is one layer from the bottom of the vat. Each printer has a layer thickness that the printer develops, which may be tens to hundreds of microns thick. An optical engine is below the vat. The optical engine uses light to expose a pattern for the initial layer derived from a three-dimensional electronic model of the object to be printed. The light causes the liquid in the vat to polymerize in that pattern and thus form solid material. The lift plate then rises a layer and then exposes the next layer of the object. This process repeats until the printer forms all layers of the object.

With photo-polymerization printers, the optical engine can produce layers with very high resolution. For example, a digital light processing (DLP) optical engine can produces patterns with millions of pixels. However, such optical engines can be relatively expensive. To be competitive, the cost of the optical engine in this type of device must be lowered while maintaining high resolution output.

SUMMARY

In accordance with an example, an optical device, includes a light source having a light source output, the light source configured to provide light at the light source output and a light integrator having a light integrator input and a light integrator output, the light integrator input optically coupled to the light source output, and the light integrator configured to provide divergent light at the light integrator output responsive to the light at the light source output. The optical device also includes projection optics having an optics input and an optics output, the projection optics configured to project projection output light at the optics output responsive to modulated light at the optics input, in which a focal point of the optics input matches a divergence of the modulated light and a spatial light modulator optically coupled between the light integrator output and the optics input, the spatial light modulator configured to provide the modulated light responsive to the divergent light.

DETAILED DESCRIPTION

In the drawings, corresponding numerals and symbols generally refer to corresponding parts unless otherwise indicated. The drawings are not necessarily drawn to scale.

The term "coupled" is herein. The term "coupled" may include connections made with intervening elements, and additional elements and various connections may exist between any elements that are "coupled." Elements are referred to herein as "optically coupled" when a connection between the elements involves transmission or reception of light.

The term "matches" is used herein in reference to projection optics and to the divergence of modulated light. As used herein, a focal point of a projection optics "matches" the divergence of modulated light when the focal point of an input of the projection optics is approximately within ±10% (as measured by the distance from the input of the projection optics to the focal point of the input of the projection optics) of the focal point of the modulated light.

In example arrangements, the problem of providing a low cost, high quality optical engine is solved by using a light integrator to direct light from a light source to a spatial light modulator, which avoids the need for additional lenses between the light source and the spatial light modulator. In an example, an optical device, includes a light source having a light source output, has the light source configured to provide light at the light source output. The optical device also includes a light integrator with a light integrator input and a light integrator output that has the light integrator input optically coupled to the light source output. The light integrator is configured to provide divergent light at the light integrator output responsive to the light at the light source output. The optical device also includes projection optics having an optics input and an optics output. The projection optics is configured to project projection output light at the optics output responsive to modulated light at the optics input. A focal point of the optics input matches a divergence of the modulated light and a spatial light modulator optically coupled between the light integrator output and the optics input. The spatial light modulator is configured to provide the modulated light responsive to the divergent light.

Figure 1:
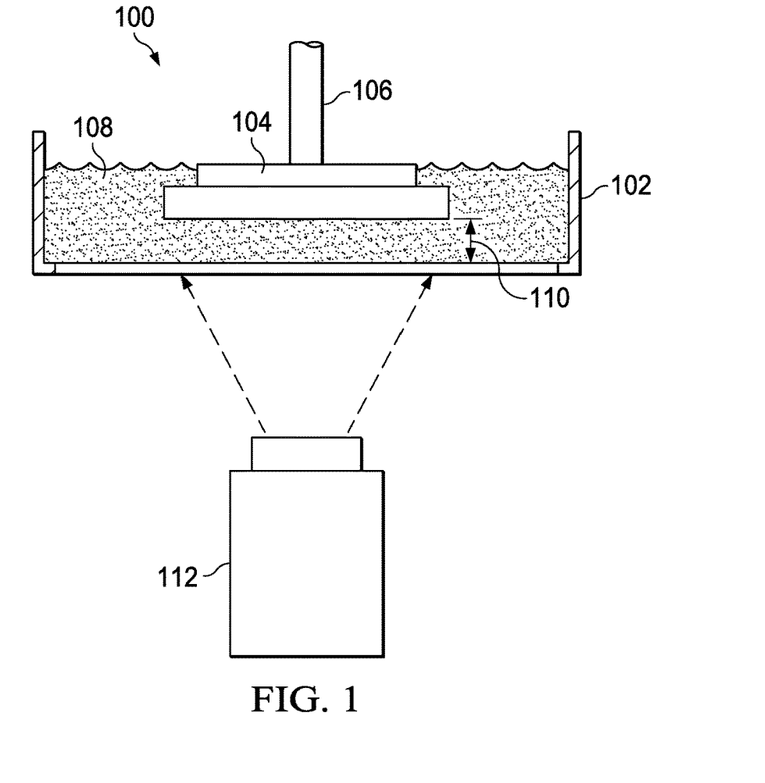
FIG. 1 is a diagram of a three-dimensional printer.

FIG. 1 is a diagram of a three-dimensional printer 100. Three-dimensional printer 100 prints a three-dimensional object layer-by-layer from an electronic model of the object. Vat 102 has a transparent bottom. Lift plate 104 is positioned in vat 102 by control arm 106. Vat 102 is filled with photo-polymerizing resin 108. Control arm 106 positions lift plate 104 a layer thickness 110 from the bottom of vat 102. In examples, the layer thickness is 0.05 to 0.15 mm. When the lift plate is in position, optical engine 112 projects light in a pattern of the first layer of the object to be printed. Where light from the optical engine 112 strikes photo-polymerizing resin 108, photo-polymerizing resin polymerizes and forms solid material. Thus, the first layer of the object to be printed is formed.

The first layer adheres to lift plate 104. Lift plate 104 is then lifted by another layer thickness 110. In some examples, control arm 106 lifts, twists and/or tilts lift plate 104 to release the first layer from the bottom of vat 102. When the lift plate 104 is in position for the next layer of the object to be printed, optical engine 112 projects light in the pattern of the next layer of the object to be printed. This process repeats until all layers of the object are printed.

Figure 2:
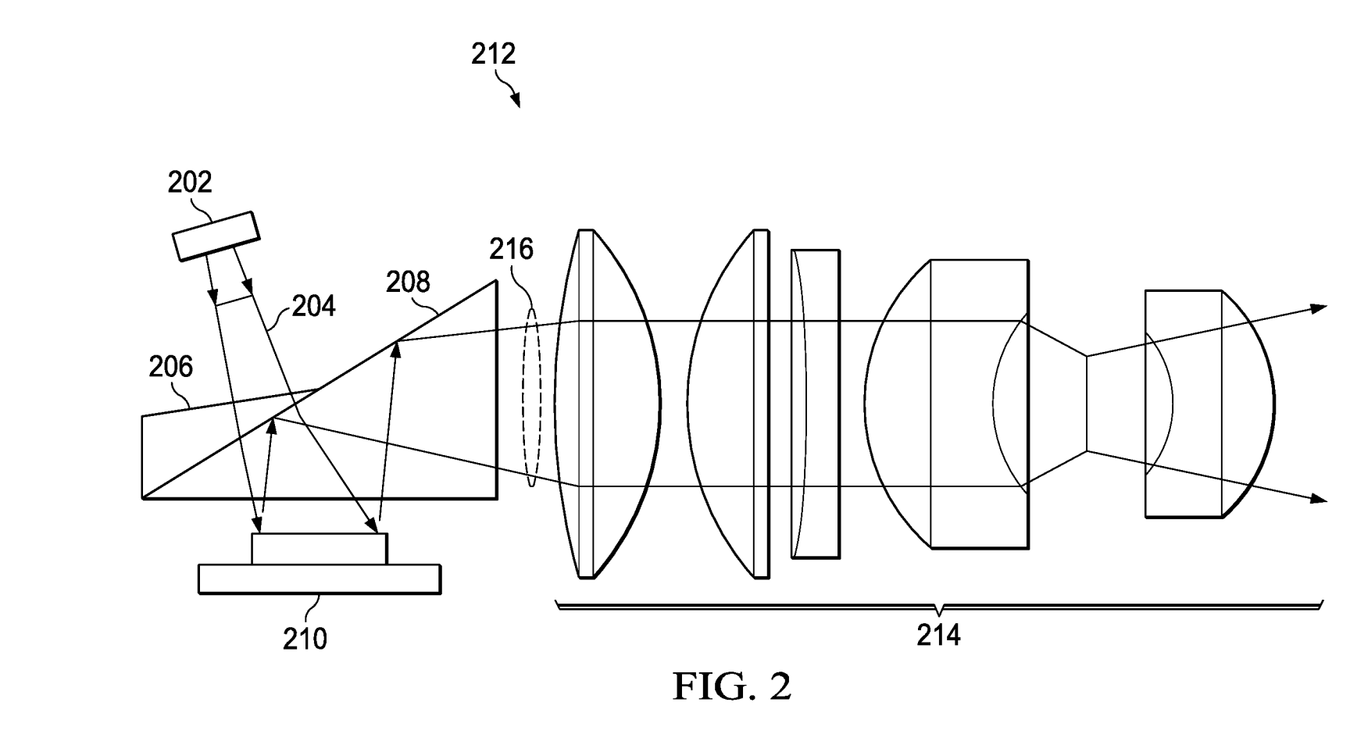
FIG. 2 is a diagram of an example optical engine.

FIG. 2 is a diagram of an example optical engine 212. Optical engine 212 is like optical engine 112 (FIG. 1). Light source 202 is a light emitting diode (LED) in this example. In other examples, light source 202 is another source of light, such as a high intensity incandescent light. In this example, the LED produces 1255 mW of optical power. The wavelength of light produced by light source 202 is selected for efficient polymerizing photo-polymerizing resin 108 (FIG. 1). In this example, light source 202 produces light of approximately 405 nm. In other examples, light source 202 produces light in a range of 350-460 nm. In many light sources for optical engines, light from the light source is collimated at the output of the light source. However, this requires additional lenses at the output of light source 202. In this example, the light integrator input of light integrator 204 is proximate to light source 202, and thus the light integrator input of light integrator 204 optically couples to light source 202. This captures as much light as possible without the need for collimating lenses. In addition, in this example, the form factor of the light integrator input of light integrator 204 is approximately the same as the form factor of the light source output of light source 202, which increases the portion of light from light source 202 that enters light integrator 204.

The light integrator output of light integrator 204 is larger than the light integrator input of light integrator 204. As explained further hereinbelow, this configuration lowers the spread of light from the light integrator output of light integrator 204 so that the light is efficiently provided to spatial light modulator 210. Light integrator 204 homogenizes the light from light source 202 by multiple reflections of the light inside light integrator 204. In addition, light integrator 204 helps direct as much light as possible onto spatial light modulator 210. As used herein, the term "light integrator" includes light tunnels, integrating rods, light pipes, and compound parabolic concentrators. Although other types of devices perform light integration, such as micro-lens arrays, these other types of devices are not included in the term "light integrator" as used herein. In this example, light integrator 204 is a light tunnel.

Divergent light from the light integrator output of light integrator 204 passes through cover prism 206. The divergent light from the light integrator output of light integrator 204 has a form that roughly matches the form factor of spatial light modulator 210. Cover prism 206 provides a surface that is perpendicular to the propagation path of the output of light integrator 204 to lower distortion of the form of light output from light integrator 204. In addition, the higher refractive index of cover prism 206 relative to air lowers the divergence of the light from the output of light integrator 204. The light then passes through an air gap (not shown) and through reverse total internal reflection prism (RTIR prism) 208. Thus, the light integrator output of light integrator 204 optically couples to spatial light modulator 210. In this example, spatial light modulator 210 is a digital micromirror device (DMD). Other examples use other spatial light modulators, such as liquid crystal on silicon (LCOS) modulators. With DMDs, each pixel is a movable mirror that modulates light by reflecting in an ON direction and an OFF direction, depending on the data for that pixel provided to the DMD. The angle of the surface of RTIR prism 208 closest to light integrator 204 is such that it reflects ON direction light from pixels reflecting of spatial light modulator 210 but does not reflect light from light integrator 204. Therefore, the image for projection reflects from RTIR prism 208 to projection optics 214, and thus spatial light modulator 210 optically couples to the optical input of projection optics 214. As noted above, the light from light source 202 is not collimated before light integrator 204. As explained further hereinbelow regarding FIGS. 3 and 4, the light exiting light integrator 204 is divergent. The pixels of spatial light modulator 210 are mirrors, therefore modulated light 216 is also divergent as it enters the optical input of projection optics 214. Projection optics are often telecentric and thus are designed for non-divergent and non-convergent (i.e. collimated) light that has an infinite input focal distance. In this example, modulated light 216 is divergent, so projection optics 214 must have an input focal point directed to the point of divergence, and thus is non-telecentric. Because light integrator 204 modifies the divergence of the light from light source 202, the point of divergence or input focal point is calculated using the angle of divergence of the light at the output of light integrator 204. Therefore, the focal point of the optics input of projection optics 214 matches the divergence of modulated light 216. As used herein, a focal point of the projection optics 214 "matches" the divergence of the modulated light 216 when the focal point of the input of projection optics 214 is approximately within ±10% (as measured by the distance from the input of the projection optics 214 to the focal point of the input of the projection optics 214) of the focal point of the modulated light 216. In other words, the focal point of the projection optics 214 matches the modulated light 216 when the projection optics 214 approximately converts the divergent modulated light 216 to telecentric light. The optics output of projection optics 214 focuses on a target. That is, the focal point of the optics output of projection optics 214 is on the photo-polymerizing resin 108 (FIG. 1) between the lift plate 104 (FIG. 1) and the bottom of vat 102 (FIG. 1). In an example, projection optics 214 may include five lenses using N-BK7 glass. In this example, the five lenses are spherical. In an example, projection optics 204 has an f-number of 3.

Figure 3:
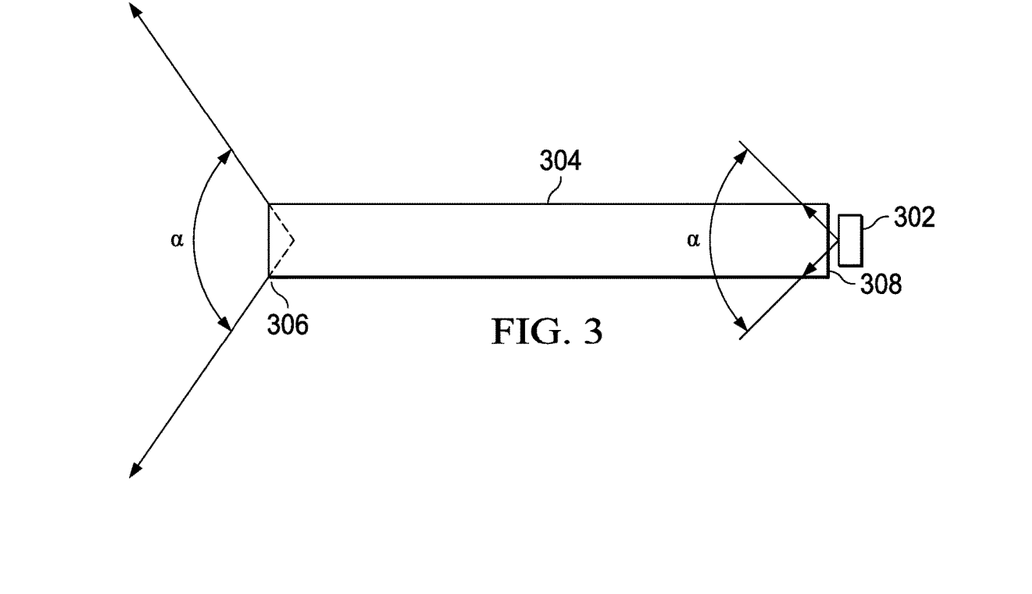
FIG. 3 is a diagram of a light integrator.

FIG. 3 is a diagram of a light integrator 304 where the output face 306 has the same size as the input face 308. With a light source 302 in proximity to input face 308, the full spread angle $\alpha$ of the light output from light source 302 enters light integrator 304. In this configuration, light integrator 304 cannot be a light rod unless the light rod has mirror coated surfaces. This is because, the angle of reflection for the light from light source 302 is too great for total internal reflection (TIR). Therefore, without reflective surfaces, too much of the output of light source 302 would pass through the walls of light integrator 304 and not propagate to output face 306. Because the walls of light integrator 304 are parallel to the propagation direction of the light, the output spread angle is also $\alpha$.

Figure 4:
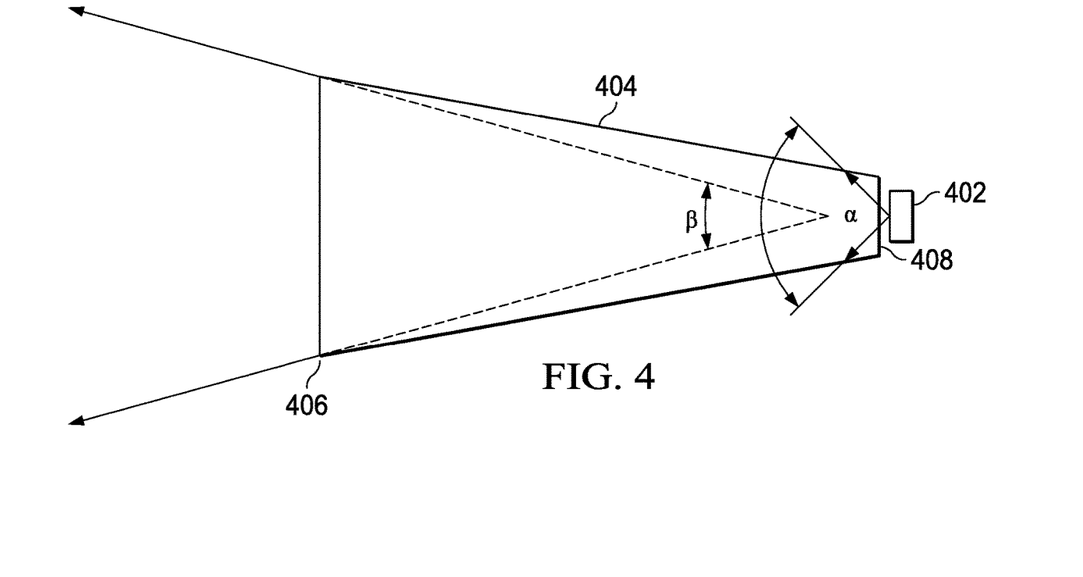
FIG. 4 is a diagram of an example light integrator.

FIG. 4 is a diagram of an example light integrator 404. Light integrator 404 is like light integrator 204 (FIG. 2). In this example, output face 406 is larger than input face 408. Light source 402 provides light having a spread of $\alpha$. However, because the walls of light integrator 404 are not parallel to the propagation direction of the light, light from light source 402 reflects at a more oblique angle. Therefore, the output spread angle $\beta$ is a smaller angle than $\alpha$. This smaller angle lowers the divergence of the light from output face 406 and thus allows for provision of the light from light integrator 404 to a spatial light modulator like spatial light modulator 210 (FIG. 2) without redirection of the light by additional lenses. In addition, this configuration may allow for the use of TIR-based integrator rods because the angle of reflection of incoming light is more oblique. As used herein, the output of a light integrator like light integrator 404 is "divergent" when β is greater than 18° (i.e. the light diverges from the output light's propagation path by greater than 9°).

Figure 5A:
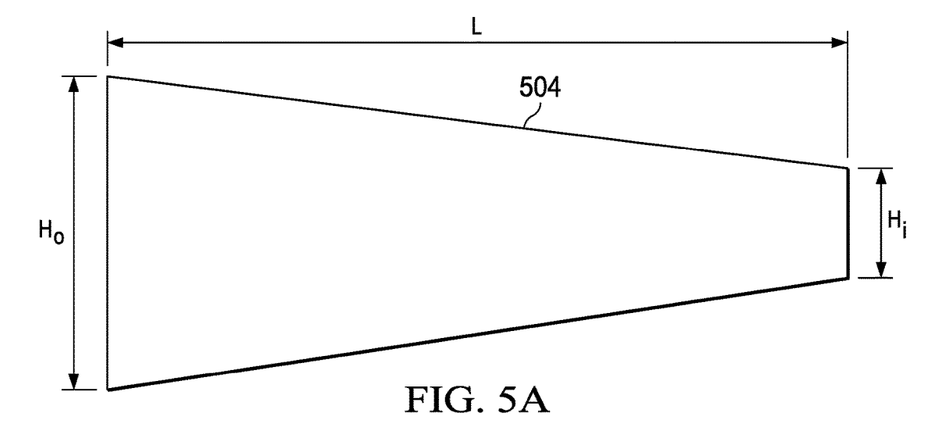
FIGS. 5A through 5D (collectively "FIG. 5") are diagrams of an example light integrator.
Figure 5B:
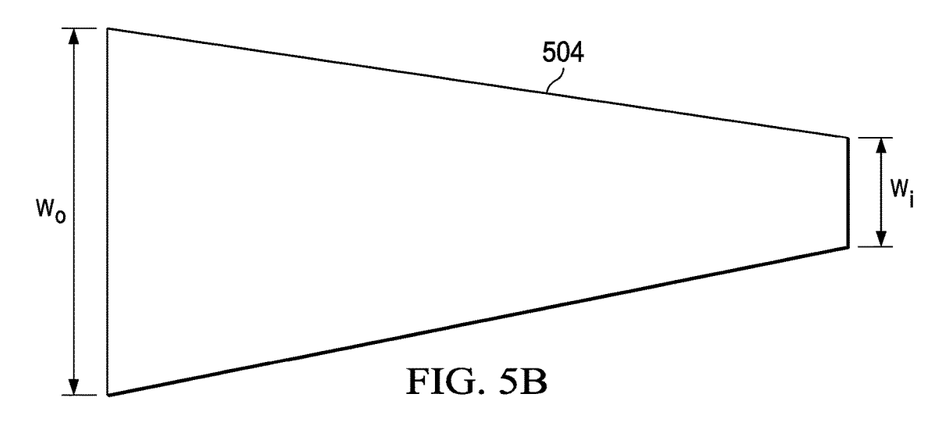
Figure 5C:
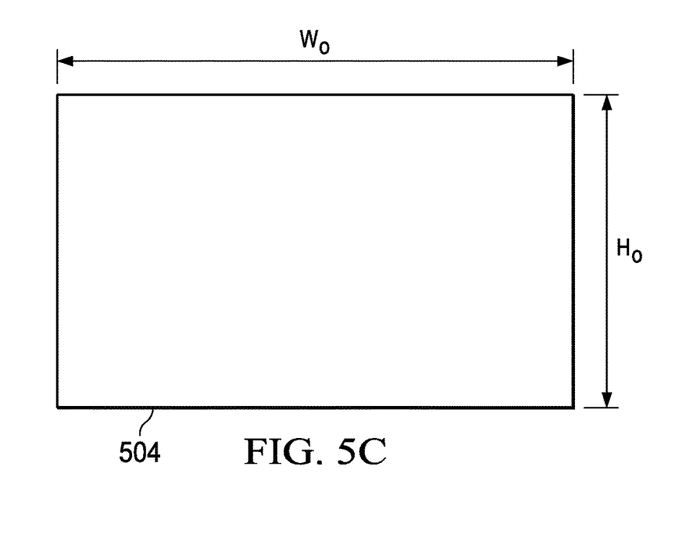
Figure 5D:
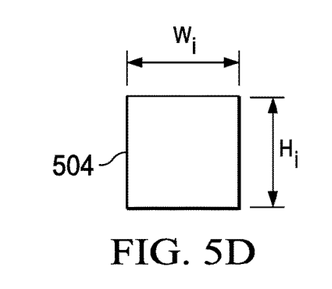

FIGS. 5A through 5D (collectively "FIG. 5") are diagrams of an example light integrator 504. Light integrator 504 is like light integrator 204 (FIG. 2). FIG. 5A is a side view of light integrator 504. FIG. 5B is a top view of light integrator 504. FIG. 5C is a view of the output of light integrator 504. The size and configuration shown in FIG. 5C is an output form factor for light integrator 504. FIG. 5D is a view of the input of light integrator 504. The size and configuration shown in FIG. 5D is an input form factor for the light integrator 504. As used herein, the terms "top" and "side" only indicate the relative position of views and do not indicate any other physical relationship. Light integrator 504 has a length L. The input of light integrator 504 has a height $H_i$ and a width $W_i$. The output of light integrator has a height $H_o$ and a width $W_o$. In an example, the input of light integrator 504 is square, thus $H_i=W_i$. In an example, the size and form factor of the input of light integrator 504 matches the size and form factor of the input light source, like light source 202 (FIG. 2), so that light integrator 504 captures the as much of the output of the light source as possible. Thus, if the output window of a light source, such as an LED, is a square that is 1 mm on each side, $H_i$ and $W_i$ would be about 1 mm, for example. In an example, L is about eight times the greater of $H_i$ and $W_i$. Thus, if $H_i$ is 1 mm, L would be 8 mm. However, in other examples, L is up to twenty times $H_i$ or $W_i$.

$H_o$ and $W_o$ are selected to match the aspect ratio or form factor of the spatial light modulator to be illuminated, such as spatial light modulator 210 (FIG. 2). The size of these dimensions involves a trade-off. The greater these dimensions are relative to the dimensions of the input of light integrator 504, the less the output light diverges. However, greater dimensions affect the uniformity of the output light and reduces the efficiency of light integrator 504. Another important design consideration is fully illuminating the spatial light modulator. With this consideration, the output pattern of light integrator 504 should be greater than the size of the spatial light modulator so that the spatial light modulator is fully illuminated.

Figure 6A:
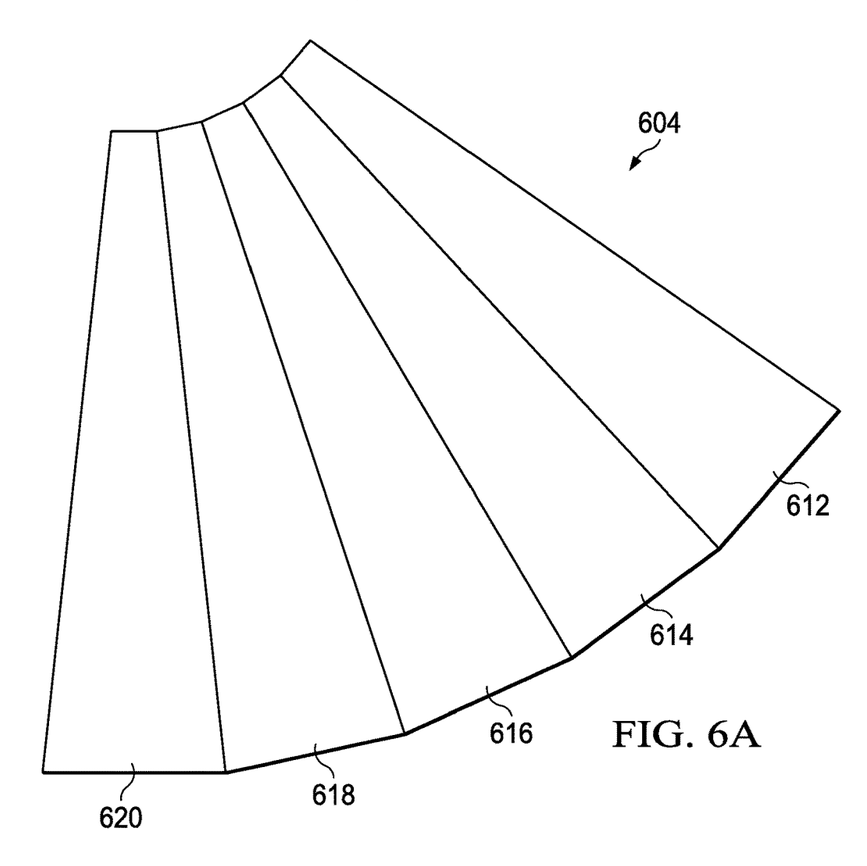
FIGS. 6A and 6B (collectively "FIG. 6") are diagrams illustrating an example method for making an example light integrator.
Figure 6B:
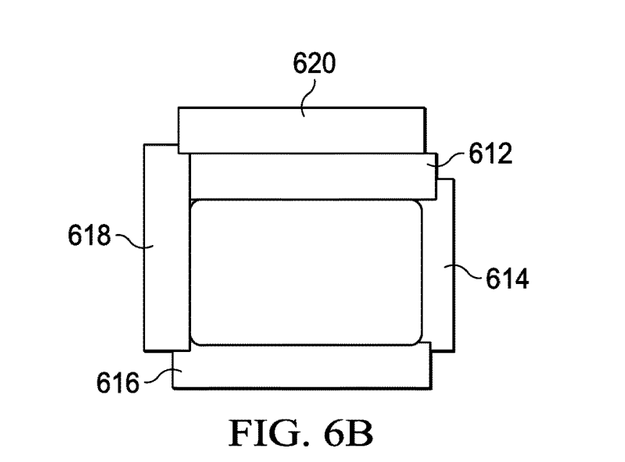

FIGS. 6A and 6B (collectively "FIG. 6") are diagrams illustrating an example method for making an example light integrator 604. The dimensions of FIG. 6 are not to scale, but rather are selected for ease of illustration. FIG. 6A shows example light integrator as a single sheet including panel 612, panel 614, panel 616, panel 618, and panel 620. One side of each of the panels includes a mirrored surface, such as a layer of aluminum. In an example, the example light integrator 604 is a sheet of aluminum with a backing for structural integrity. The sheet is folded at an angle of 90° at the boundary between panels such that panels 612 and 620 fold onto each other. Thus, this example light integrator is easy to manufacture, and thus inexpensive.

Figure 7:
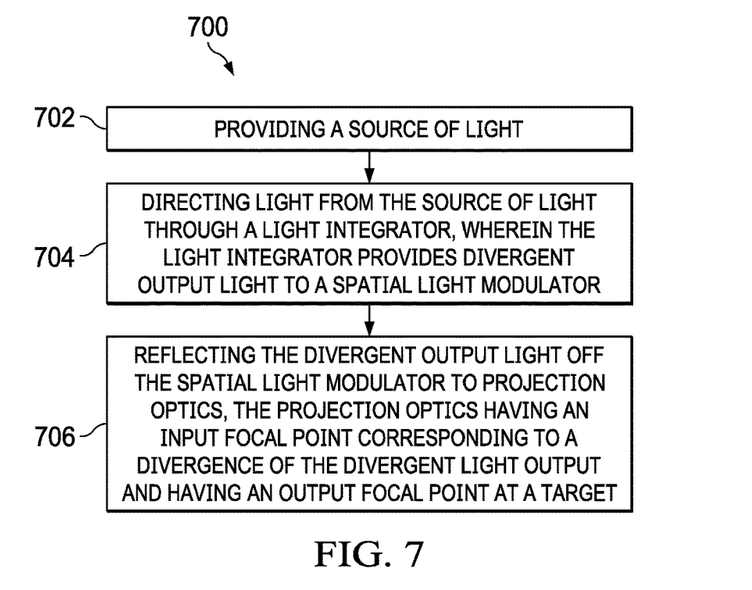
FIG. 7 is a flow diagram of an example method.

FIG. 7 is a flow diagram of an example method 700. Step 702 is providing a source of light, such as light source 202 (FIG. 2). Step 704 is directing light from the source of light through a light integrator, such as light integrator 204 (FIG. 2), wherein the light integrator provides divergent output light to a spatial light modulator. Step 706 is reflecting the divergent output light off the spatial light modulator, such as spatial light modulator 210 (FIG. 2) to projection optics, such as projection optics 214 (FIG. 2), the projection optics having an input focal point corresponding to a divergence of the divergent output light and having an output focal point at a target.

Modifications are possible in the described examples, and other examples are possible, within the scope of the claims.

What is claimed is:

1. An optical device, comprising:
   a light source having a light source output, the light source configured to provide light at the light source output;
   a light integrator having a light integrator input and a light integrator output, the light integrator input optically coupled to the light source output, and the light integrator configured to provide divergent light at the light integrator output responsive to the light;
   projection optics having an optics input and an optics output;
   a spatial light modulator; and
   a reverse total internal reflection prism optically coupled between the light integrator and the spatial light modulator and between the spatial light modulator and the projection optics, the reverse total internal reflection prism configured to direct the divergent light towards the spatial light modulator;
   the spatial light modulator configured to produce modulated light responsive to the divergent light;
   the reverse total internal reflection prism further configured to direct the modulated light towards the projection optics; and
   the projection optics configured to project output light at the optics output responsive to receiving the modulated light at the optics input, wherein a focal point of the optics input matches a divergence of the modulated light.

2. The optical device of claim 1, wherein the light integrator input has an input form factor that matches a form factor of the light source output and the light source output is proximate to the light integrator input.

3. The optical device of claim 1, further comprising a cover prism optically coupled between the light integrator and the reverse total internal reflection prism, wherein the cover prism has a surface perpendicular to a propagation path of the divergent light.

4. The optical device of claim 1, wherein the light source is a light emitting diode.

5. The optical device of claim 1, wherein the light integrator is a light tunnel.

6. The optical device of claim 1, wherein the divergent light has a pattern corresponding to a form factor of the spatial light modulator.

7. The optical device of claim 1, wherein the projection optics includes five lenses.

8. The optical device of claim 1, further comprising:
   a vat having a transparent bottom; and
   a lift plate in the vat;
   wherein the projection optics is configured to project the output light through the transparent bottom of the vat.

9. The optical device of claim 8, the vat containing a photo-polymerizing resin.

10. The optical device of claim 8, further comprising a control arm coupled to the lift plate, the control arm configured to move the lift plate.

11. The optical device of claim 1, wherein the light integrator output is larger than the light integrator input.

12. The optical device of claim 1, wherein the light integrator input has a height, the light integrator has a length, and the length is about eight times the height.

13. The optical device of claim 3, wherein an air gap is between the cover prism and the reverse total internal reflection prism.

14. The optical device of claim 1, wherein the spatial light modulator is a digital micromirror device (DMD) or a liquid crystal on silicon (LCOS) modulator.

15. The optical device of claim 1, wherein the projection optics are non-telecentric.

16. The optical device of claim 1, wherein the projection optics has an f-number of 3.

17. The optical device of claim 1, wherein the light integrator has aluminum sides.

18. An apparatus comprising:
a light source configured to produce light;
a light integrator having a light integrator input and a light integrator output, the light integrator input optically coupled to the light source, and the light integrator configured to provide divergent light at the light integrator output responsive to receiving the light at the light integrator input;
projection optics having an optics input and an optics output;
a spatial light modulator;
a reverse total internal reflection prism optically coupled between the light integrator output and the spatial light modulator and between the spatial light modulator and the projection optics, the reverse total internal reflection prism configured to direct the divergent light towards the spatial light modulator; and
a cover prism optically coupled between the light integrator and the reverse total internal reflection prism;
the spatial light modulator configured to produce modulated light responsive to the divergent light;
the reverse total internal reflection prism further configured to direct the modulated light towards the projection optics; and
the projection optics configured to project output light responsive to receiving the modulated light, wherein a focal point of the optics input matches a divergence of the modulated light.

19. An apparatus comprising:
a light source configured to produce light;
a light integrator having a light integrator input and a light integrator output, the light integrator having reflective walls, the light integrator input optically coupled to the light source, and the light integrator configured to provide divergent light at the light integrator output responsive to receiving the light at the light integrator input;
projection optics having an optics input and an optics output;
a spatial light modulator; and
a reverse total internal reflection prism optically coupled between the light integrator output and the spatial light modulator and between the spatial light modulator and the projection optics, the reverse total internal reflection prism configured to direct the divergent light towards the spatial light modulator;
the spatial light modulator configured to produce modulated light responsive to the divergent light;
the reverse total internal reflection prism further configured to direct the modulated light towards the projection optics; and
the projection optics configured to project output light responsive to receiving the modulated light, wherein a focal point of the optics input matches a divergence of the modulated light.

20. The apparatus of claim 19, further comprising a cover prism optically coupled between the light integrator and the reverse total internal reflection prism.

* * * * *